United States Patent
Cooper

(10) Patent No.: US 9,112,968 B1
(45) Date of Patent: Aug. 18, 2015

(54) PROVIDING ALTERNATIVE INFORMATION OVER CALLER ID

(71) Applicant: THOMSON LICENSING, Issy de Moulineaux (FR)

(72) Inventor: Steven Lee Cooper, Whitestown, IN (US)

(73) Assignee: Thomson Licensing, Issy Les Moulineaux (FR)

( * ) Notice: Subject to any disclaimer, the term of this patent is extended or adjusted under 35 U.S.C. 154(b) by 0 days.

(21) Appl. No.: 13/973,348

(22) Filed: Aug. 22, 2013

(51) Int. Cl.
H04M 3/12 (2006.01)
H04M 1/56 (2006.01)
H04M 15/06 (2006.01)
H04M 3/42 (2006.01)

(52) U.S. Cl.
CPC .................. *H04M 3/42059* (2013.01)

(58) Field of Classification Search
CPC .............. H04M 1/2478; H04M 1/575; H04M 2001/27; H04M 2001/274; H04M 3/42042; H04M 3/5322; H04M 3/5307; H04Q 1/00; H04Q 1/45
USPC ................. 379/67.1, 68, 88.11, 88.12, 88.14, 379/88.19, 88.21, 88.22, 93.17, 93.23, 379/100.06, 100.13, 142.01, 142.02, 379/142.03, 142.09, 142.14, 142.17, 201.12
See application file for complete search history.

(56) References Cited

U.S. PATENT DOCUMENTS

| | | | |
|---|---|---|---|
| 6,005,921 A * | 12/1999 | Keefe et al. | 379/29.06 |
| 6,498,931 B1 * | 12/2002 | Mayak et al. | 455/415 |
| 6,603,840 B2 | 8/2003 | Fellingham et al. | |
| 7,280,646 B2 | 10/2007 | Urban et al. | |
| 7,283,625 B2 | 10/2007 | Urban et al. | |
| 7,471,671 B2 | 12/2008 | Xiong et al. | |
| 7,995,715 B2 | 8/2011 | Bhatia et al. | |
| 7,995,730 B1 | 8/2011 | Zhang et al. | |
| 8,073,121 B2 | 12/2011 | Urban et al. | |
| 2005/0031095 A1 * | 2/2005 | Pietrowicz | 379/88.18 |
| 2007/0127666 A1 * | 6/2007 | Rabinovich et al. | 379/201.12 |
| 2012/0266107 A1 * | 10/2012 | Bates et al. | 715/838 |

OTHER PUBLICATIONS

ATIS-1000641.1995(R2009): "Calling Name Indentification Presentation", American National Standard of Telecommunications, whole document.

* cited by examiner

*Primary Examiner* — Binh Tieu
(74) *Attorney, Agent, or Firm* — Robert D. Shedd

(57) ABSTRACT

Additional information and/or status messages are routed to a telephone 124 by a gateway device 110 via a caller identification (ID) process. The gateway device determines when a status or information message is available and distributes the message to the telephone when a user answers the telephone. In a similar fashion, a user can call a special telephone number on a plain old telephone system (POTS) 202, hang up the telephone 204 and receive a status/information message as a caller ID message upon a callback by the POTS.

21 Claims, 5 Drawing Sheets

PROVIDING ALTERNATIVE INFORMATION OVER CALLER ID

BACKGROUND

Conventional landline phones, including phones that may operate in a voice over Internet Protocol (VOIP) system, have limited or no direct access to the Internet through the telephone. As a result, status updates (including outages, payment status, weather, etc.) are not easily provided to a telephone handset. It would be highly convenient for a user to be able to access this type of information from the telephone.

SUMMARY

A mechanism is created to allow additional information to be provided to a telephone using the caller ID processing already found in the telephone. Certain status information regarding a service (e.g., phone service, or similar short information based service) and the like is communicated using the caller ID feature found in telephones. It can be applied directly to information transferred on a land or wireless line, or can be similarly be used in a VOIP system through an advanced gateway device and the like.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
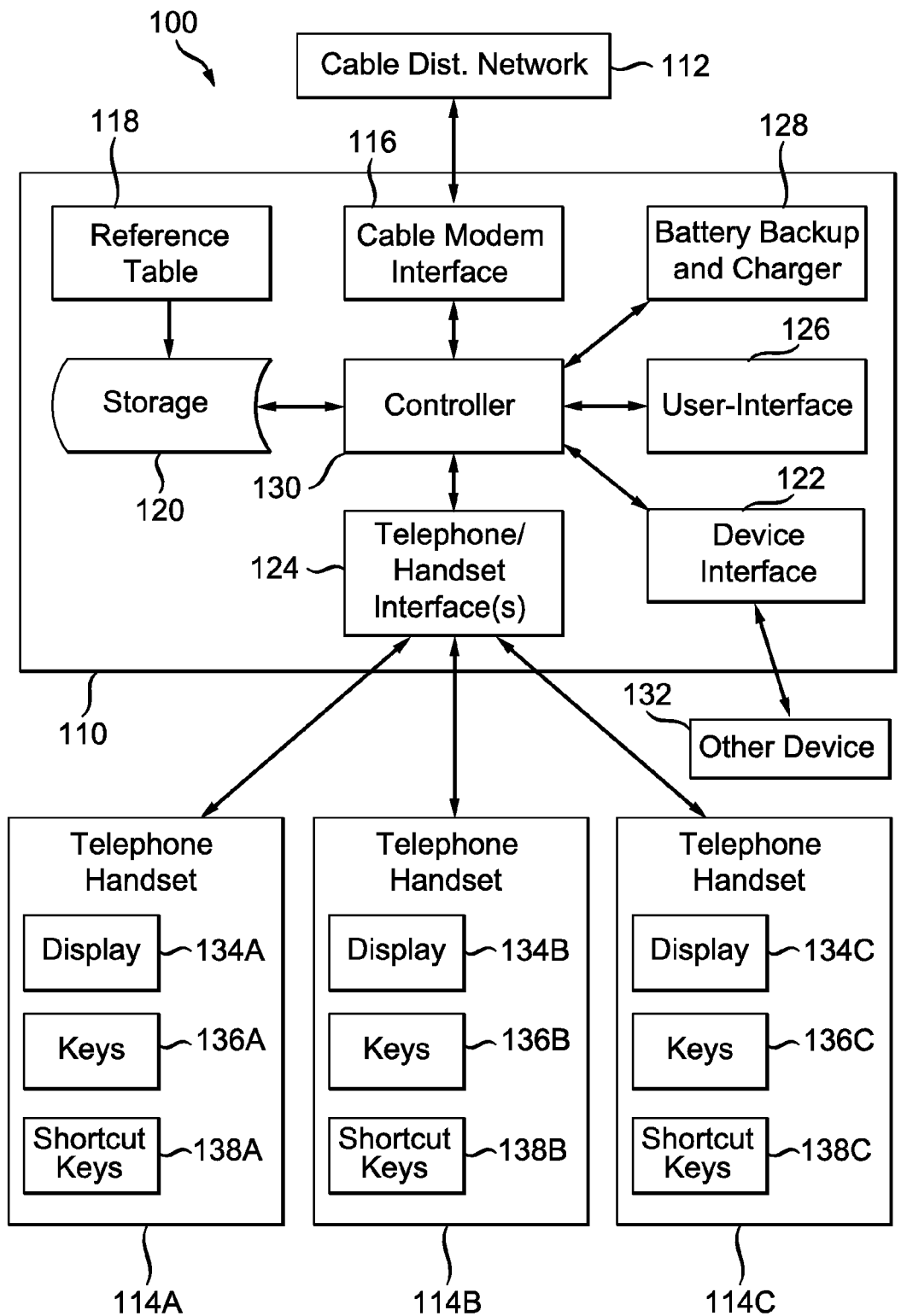
FIG. 1 is an example an advanced cable gateway illustrating an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

Currently, only caller identification information is displayed on telephones. The caller ID process, however, can be used to transfer other information to a telephone user. The techniques herein are not burdened by, for example, the overhead of an SMS network for message sending, and, more importantly, they operate within the constraints of a landline telephone system, allowing use of conventional landline telephones—without requiring additional changes.

The disclosed mechanisms rely on the structure of caller ID information. To send caller ID information to your home, the phone company uses a Frequency Shift Keying (FSK) technique identical to a 1,200 baud modem and sends ASCII character data to a caller ID circuit. The modem message is sent between the first and second ring of the telephone. After the first time the phone rings, a "bleeeep" about a half second long is sent through the phone line. When the bleep is decoded by the receiving telephone, it contains (in the simpler of the caller ID systems) the following:

A series of alternating "1"s and "0"s to help the caller ID box get the timing down A series of 180 "1"s A byte representing the type of message A byte representing the length of the message Month, day, hour and minute, each represented with a pair of bytes The 10 digit phone number in 10 bytes A checksum byte A more advanced system can also contain a caller's name, etc., using what is known as multiple data messaging format, but its technique is identical to the above. Each character is sent as a standard 8-bit ASCII character preceded by a "0" start bit and followed by a "1" stop bit. It is important to note that the length of the caller ID message can be limited by hardware and/or various specifications. For standard POTS phones with Caller ID capability, the decode and display can be limited to 15 characters. The Automatic Terminal Information Service (ATIS) Standard (ATIS-1000641.1995 (R2009) states that "NameData" field is an octet string up to 50 octets long. This can be construed as a maximum limit of the Caller ID. However, the Standard also states that "The network shall be able to deliver a variable length name that is 1 to 15 characters" (Section 6.3.2.2.1 of the Standard). In other words, the length of the name field can be 50 characters, but service providers can choose to limit this further to 15 characters for delivery to customer equipment. Additionally, Digital Enhanced Cordless Telecommunications (DECT) standards allow for a longer "name" presentation (see generally, European Telecommunications Standards Institute (ETSI), ETSI EN 300 444 V2.3.1 (2012-04), which can be found at http://www.etsi.org/deliver/etsi_en/300400_300499/300444/02.03.01_60/en_300444v020_301p.pdf). The ETSI standard refers to the Calling Name Identification Presentation (CLIP) display, but does not specify a maximum length. Cordless Advanced. Technology-internet and quality ("CAT-iq") is a technology initiative from the DECT standards body that can allow for even longer lengths.

Depending on the network used, the user can initiate a status request using a telephone device directly (such as dialing a telephone number over a landline network), or can initiate access using a specific speed dial code to request a gateway device to access an interact service. In this second approach, the requested status information is provided to the gateway device. The gateway device then converts (or repackages) the information into the caller ID format for delivery to the phone handset. Since the gateway device controls the hook and ring function of the telephone handset line, the information is more easily transmitted to the handset. In this case, the information can be sent without providing a first ring. The gateway device can establish the connection to the handset (simulating a ring) and then provide the status message, Since the length of the caller ID information can vary based on technologies and/or a company's implementation of a standard, a user initiated test mode can be implemented where a VOIP device sends messages of different sizes to a user's handsets. A user can then respond via a graphical user interface (GUI) and/or via a voice menu using with Basal-tone multi-frequency signaling (DTMF) responses and the like to the messages seen on each handset. This allows the system to determine if more than 15 characters can be displayed on a particular handset, allowing the system to display longer messages with breaking it up onto multiple 15 character groupings. As standards and technology progress, one skilled in the art can appreciate that future versions of handsets could automatically report to the system their display capabilities for caller ID signals without requiring user initiated test modes and/or other types of user intervention, In the former case of utilizing the landline, the user first places the telephone call and then hangs up or disconnects the call in some other fashion. The service called (e.g., a special phone number at the telephone company) then calls hack and provides the additional information in place of the caller ID information displayed on the telephone. The user waits for the first ring and then views the additional information on the phone, As noted above, the caller ID length is limited. However, multiple caller ID messages can be strung together by placing multiple sequential phone calls. As above, this mechanism is easier in a VOIP gateway device, because the gateway device controls the hook and ring functions. The gateway device can pull down power (indicating a call termination on the handset) and then send the next message. A similar process can be accomplished in the landline setting that includes user interaction by viewing the status information (including an identifier indicating "more" is available), the user answering the call and then terminating the call. The phone service then calls back with the next portion of the status message.

The following are examples of additional information that can be provided for telephone and internet service status:
   Can't reach network
   Detect that RF signal is broken/connectivity status
   Certain service registration has failed
   Network outages (locations, times, etc)
   Pay your bill/overdue notice
   Further, in addition to the description above as a "demand mode" service initiated by the user, the service can be "pushed" to users. In this way, updates can be pushed to users, The status messages provided can be stored in the telephone as needed. Further, if necessary, the network (either the phone network, or gateway device) or the telephone itself (e.g., as a new feature) can block future caller ID's (the proper ones) from being transmitted to the telephone in order to prevent overwriting the last received status message if memory storage is limited. The blocking, can be time initiated and triggered and can further be user defeatable (e.g., through an additional telephone call or interne service request). The additional information feature is easily expanded beyond phone and/or network status updates to, for example, weather, sports and/or news updates and the like. The feature can also provide one or more of these enhanced additional information services as a fee based service.

FIG. 1 shows an example 100 of an Advanced Gateway Device 110 (for use in Cable, Wireless LTE, or DSL) that also includes a VOIP system. As noted above, the mechanisms can also be used directly in a Plain Old Telephone System (POTS) and/or wireless (non-internet) system, with information provided directly through the telephone network. The advanced cable gateway device 110 interfaces to a cable signal distribution network 112 outside a home, or user premises, and to devices, such as telephone handsets 114A-114C, present inside the home. The advanced cable gateway device 110 generally operates as a data cable modem as well as a voice over internet protocol (VOW) interface for home telephony.

The advanced cable gateway device in FIG. 1 includes a cable modem interface 116, a reference table 118, a storage device 120, an external device interface 122, a telephone/handset interface 124, a user interface 126, and battery backup and charger 128 all interconnected with a central controller 130 as shown. The cable modem interface 116 operates to tune and demodulate a received signal from the cable distribution network or to modulate and transmit an outgoing signal to the cable distribution network. The cable modem interface 116 passes control information and data transport streams to and from the controller 130. The device interface 122 communicates data between the controller 130 and one or more external devices 132. External devices 132 can include, but are not limited to computers, tablets, video displays, and the like. Depending on design selections, some or all of the external devices 132 can be internal. The communications is typically data communications that include one or more of Internet information, video, and/or audio. The communication with the external devices 132 can be done through a wired or wireless interface, The user interface 126 can include a mouse, a button keypad, and/or a touch screen and may include video display technology. The user interface 126 provides user control of the device. The user interface 126 can be provided by a web server, allowing control through the controller 130 and device interface 122 to any external device 132, via a wired and/or wireless Internet Protocol (IP) based connection. The reference table 118 and storage element 120 provides local storage of data including video content (including program guide information), contact lists, device setting, and the like. The telephone/handset interface 124 provides telephony and control information between the controller 130 and one or more external telephone handsets 114A-114C. The communication is typically made over a twisted pair phone line. However, other protocols and media can be used, such as digital enhanced cordless telecommunications (DECT).

Each telephone handset 114A-114C includes traditional phone circuits as well as a display 134A-134C for the user, including phone numbers, dialing information and the like such as caller ID and additional information described above. The telephone handset also includes a keypad with keys 136A-136C, either as a set of buttons or a touch screen. The telephone handset can also include an additional set of buttons, used as shortcut keys 138A-138C. The keys and/or shortcut keys can be used to dial and/or speed dial a special telephone number to retrieve the additional information as described above. These handsets can also be more advanced, such as DECT and/or Cat-Iq handsets.

The controller 130 in the main device 110 in FIG. 1 provides a main interface, data protocol translation and decoding, and routing function for the various network interfaces connected to the device 110. The controller 130 also manages the storage and retrieval of data and/or control information to and from the reference table 118 and storage element 120. The controller 130 also provides user interface information and processes user inputs communicated through the user interface 122.

The advanced cable gateway device 110 in FIG. I also includes a backup battery and charging system 128 in communication with controller 130. The battery backup system in the device 110 is provided to maintain telephone operation in the event of a normal power interruption. As such, when a power interruption occurs, the device 110, through operations in the controller 130, can cease to operate except as needed to operate as a telephone interface 124 to the connected telephone handsets 114A-114C and to permit VOIP service through the cable network 112. The battery in the backup battery and charging system 128 can be any type of rechargeable battery, including, but not limited, to a nickel cadmium or nickel metal hydride type. The charger can be a standard battery charging circuit and can be controlled by the controller 130. In addition to all of the other functions in the device 110, the controller 130 maintains the battery condition based on a set of management principles.

One skilled in the art can appreciate that the mechanisms disclosed herein are not limited to only cable systems. They can also be applied to wireless systems such as, for example, Third generation of mobile telecommunications technology ("3G") systems, Long Term Evolution of mobile telecommunications technology ("LTE") systems, Worldwide Interoperability for Microwave Access ("WiMax") systems, etc., and/or fiber optic systems, satellite systems, or modems connected to phone lines and the like.

Figure 2:
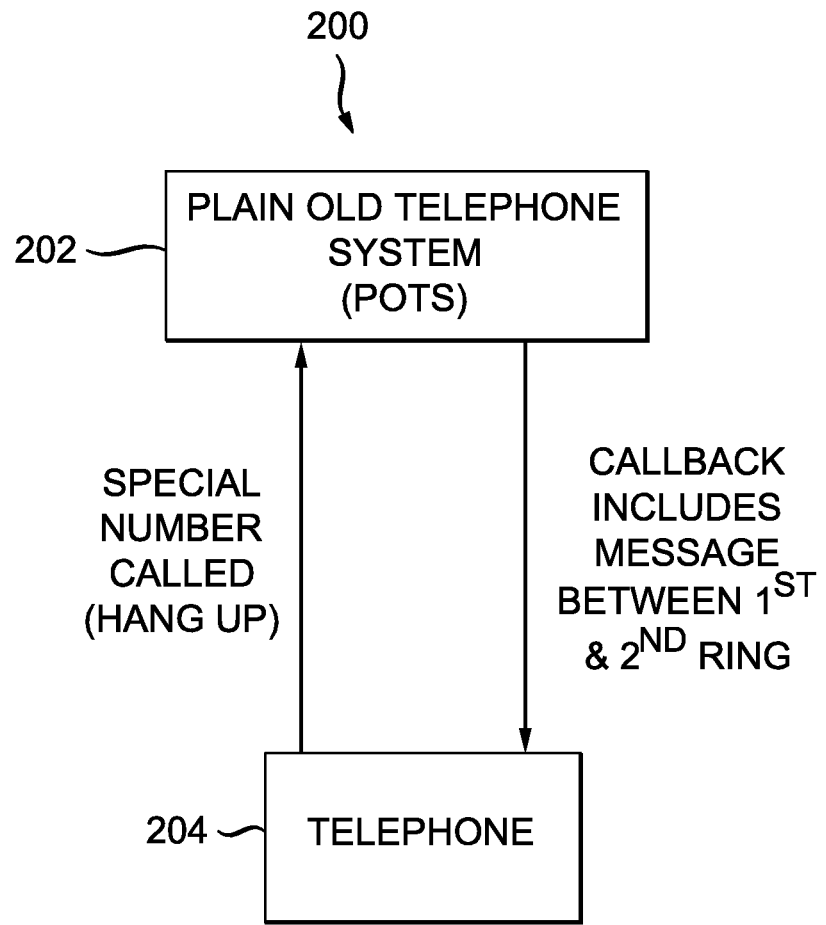
FIG. 2 is an example of a system that includes a telephone in a user's home that is connected to a POTS communication system.

FIG. 2 is an example of a system 200 that includes a telephone 204 in a user's home that is connected to a POTS communication system 202. The telephone 204 is equipped with some form of display to relay information to the user. This is often a liquid crystal display (LCD) used for dialing and caller 1D functions. It should be noted that the display can also reside on a standalone caller ID device. These devices generally only show caller ID information (e.g., no telephone or dialing features, etc.). Some of the devices do not have a display at all and read the caller ID status out loud. The techniques disclosed herein are applicable to voice only caller ID and/or display only caller ID devices and the like as well.

A user takes the telephone 204 off of the hook and dials a "special" number. This number can be set up by the POTS provider for use by the service subscriber. Calling the number triggers the POTS provider to check for any status/information message available for the subscriber calling the special number. If a message is available, the POTS provider converts the message to a caller ID format and does a callback to the subscriber. Between the first and second ring, the message is displayed in place of the typical caller ID information. The user does not have to answer the telephone to receive the message.

Figure 3:
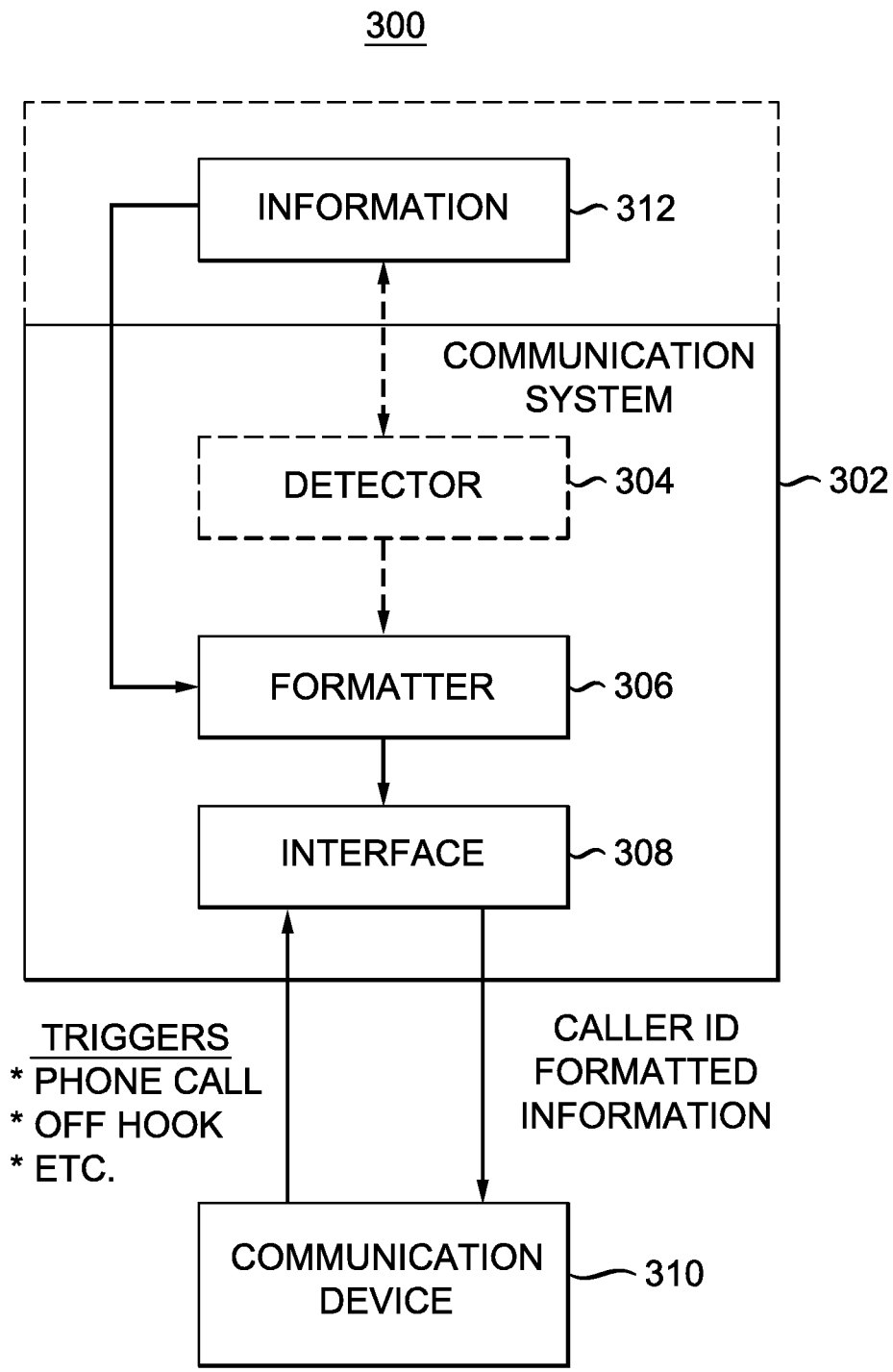
FIG. 3 is an example system that provides messages in a caller ID format.

FIG. 3 shows an example system 300 that provides information 312 in a caller ID format. The system 300 comprises a communication system 302 with an optional information detector 304, a formatter 306 and an interface 308. The communication system 302 communicates with a communication device 310. In a typical scenario, the communication device 310 provides a trigger to the interface 308. The trigger can be, for example, a phone call, lifting a handset off of a receiver, pressing a button and the like (e.g., speed dialing, dedicated call button, etc.) associated with the communication device 310. These external triggers can be relayed from the interface 308 to the information detector 304. This triggers the optional detector 304 to look for information associated with the communication device 310. This can include, but is not limited to, information about the communication device 310 (e.g., status, outages, updates, etc.) and/or about a user of the communication device 310 (e.g., overdue payments, offers to sell, advertisements, etc.). The optional detector 304 can also automatically detect information. In the latter case, the detected information is pushed to the interface 308 by the optional detector 304 via the formatter 306 and on to the communication device 310. This method is generally used in gateway type communication systems where delivery can be controlled without user interaction. The information can originate within the communication system 302 and/or from sources external to the communication system 302.

In a similar fashion, the detector 304 can be set to receive information from internal and/or external sources. In this scenario, the detector gathers the received information and relays it to the formatter 306 for format processing. In a large gateway system with multiple communication devices, the detector 304 can receive large amounts of information that can include source identifiers, and the detector 304 can process the identifiers to a specific piece of communication hardware. This allows the information to be directed to that specific handset, etc, in a communication system of multiple handsets and the like. Likewise, if the communication system is a gateway based system, a determination might be made that wireless communications, for example, could be interrupted from 7 pm to 9 pm. Information can then be transmitted to those communication devices that rely on wireless data systems and not transmitted to wired based communication devices.

The formatter 306 formats information into a caller ID format. The caller ID format can change based upon the sophistication of the communication device 310 (e.g., some devices can only display caller ID number while other devices can display both caller ID name and number, etc.) and/or based upon changes in the caller ID standards. The formatter 306 can alter the formatting to correctly output a caller ID message containing information unrelated to an identification of a caller. The interface 308 receives the formatted information and communicates it to the communication device 310. The communications between the interface 308 and the communication device 310 can differ depending on the type of communication system 302 employed. A gateway based system has more control over a VOIP type communication device and, thus, messages can be automatically formatted and pushed to the communication device 310 with and/or without user interaction. The communication system 302 can also simulate rings and the like so that the user of the communication device 310 is aware of a new message. If the communication system 302 is of a POTS nature, the communication system is more likely to use externally applied triggers such as a user calling a specific number and waiting for a callback with the information contained in it. One skilled in the art can appreciate that these techniques are not exclusive to one type of system or the other. Hybrids of the techniques can be used with both systems.

Figure 4:
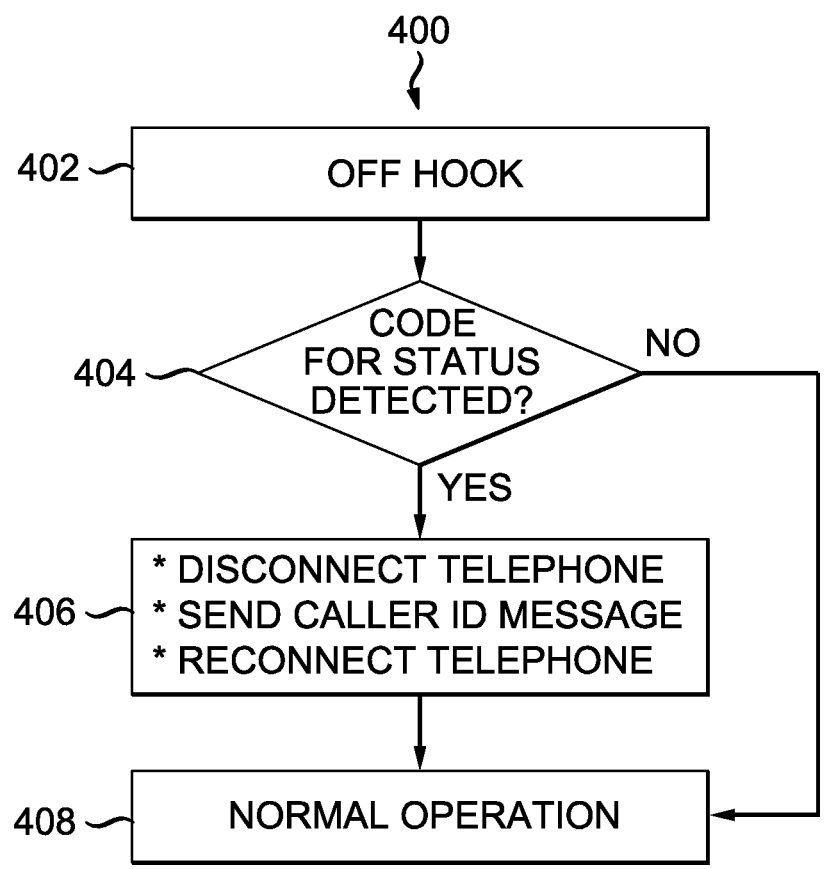
FIG. 4 is a flow diagram of a method of providing additional information utilizing a caller ID process in a gateway communication system.

In view of the exemplary systems shown and described above, methodologies that can be implemented in accordance with the embodiments will be better appreciated with reference to the flow charts of FIG. 4. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein.

Moreover, not all illustrated blocks may be required to implement the methodologies in accordance with the embodiments.

FIG. 4 is a flow diagram of a method 400 of providing additional information utilizing a caller ID process. This example provides a framework for the process described above for use in a gateway device/VOIP system. The method starts 402 by a user picking up the telephone receiver which also powers up the telephone so that a call can be received/placed. A check is then made by the gateway device to determine if a code is present that represents a detected status and/or additional information message is present 404. If no code is detected, the telephone enters normal operation 408. If a code is detected, the gateway device disconnects the telephone, sends the status/additional information to the telephone and then reconnects the telephone 406. The status/additional information message is displayed on the telephone and/or telephone handset. Once the message is received, the telephone goes back into normal operation 408. The gateway device converts the status/information into a caller ID format for delivery to the telephone. The gateway device controls the hook and ring function of the telephone line and status/information is more easily transmitted to the telephone. Thus, the information can be sent to the telephone without providing a first ring. Similarly, a gateway device can establish a connection to the telephone (simulating a ring) and then provide the status/information message.

Figure 5:
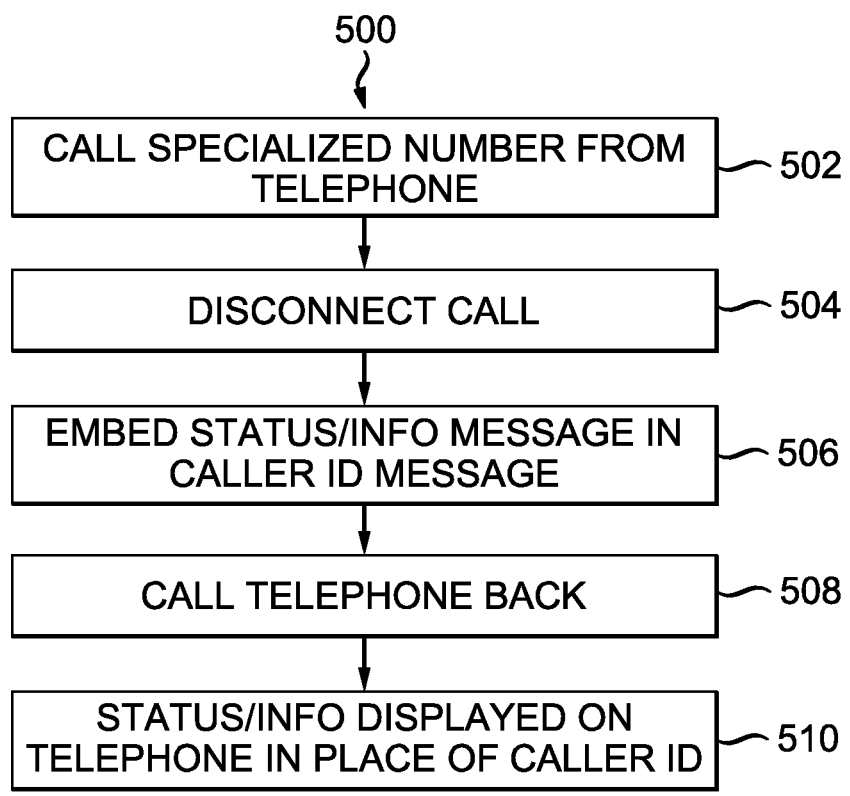
FIG. 5 is a flow diagram of a method of providing additional information utilizing a caller ID process in a POTS communication system.

FIG. 5 depicts a flow diagram of a method 500 of providing additional information utilizing a caller ID process in a POTS communication system. The method 500 starts by calling a specialized number from a POTS telephone 502. The specialized number is a number that has been designated to trigger a response from the POTS service provider. This number would be typically given to a subscriber of the service when they sign up with the POTS service provider. After placing the call, the user hangs up or disconnects the call 504. This can include holding the receiver hook down or placing the receiver in its cradle. When the POTS service provider receives the incoming call on the specialized number, they embed status/information messages into the caller ID message 506. This can include reformatting the status/information message to conform with the caller ID format. The POTS service provider can also determine that no new messages are available and embed "no messages" and the like into the caller ID message.

The POTS service provider then calls back the telephone of the subscriber that called the specialized number 508. The subscriber then receives the status/information message displayed on their telephone in place of the normal caller ID information 510. This typically occurs between the first and second ring. There is no need for the subscriber to actually answer the telephone to receive the message. If the subscriber also has display only and/or voice caller ID devices, they will receive the status/formation message on those devices as well.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A gateway apparatus that distributes information through a communication system, the gateway apparatus comprising:
   a controller coupled to a memory, the controller configured to:
   access an Internet service;
   detect whether a predefined code is received from a communication device;
   if the predefined code is received:
      disconnect the communication device from the communication system;
      format information unrelated to an identification of a caller into a caller identification format, the information being received by the controller via the Internet service;
      transmit the formatted information to the communication device; and
      reconnect the communication device to the communication system.

2. The gateway apparatus of claim 1 wherein the controller is further configured to detect information for a communication device of a user.

3. The gateway apparatus of claim 2, wherein the controller is further configured to detect information when a trigger is received.

4. The gateway apparatus of claim 2, wherein the controller is further configured to detect information automatically.

5. The gateway apparatus of claim 1, wherein the controller is further configured to transmit information when a trigger is received.

6. The gateway apparatus of claim 1, wherein the controller is further configured to transmit information automatically when the controller detects a message.

7. The gateway apparatus of claim 1, wherein the communication system comprises a plain old telephone system (POTS).

8. The gateway apparatus of claim 1, wherein the controller is further configured to transmit more than one message to the communication device when an amount of information is larger than can be contained in a single caller identification formatted message.

9. A method for distributing information through a communication system:
   accessing, using a gateway device, an Internet service;
   detecting, using the gateway device, whether a predefined code is received from a communication device;
   if the predefined code is received:
   disconnecting, using the gateway device, the communication device from the communication system;
   formatting, using the gateway device, information unrelated to an identification of a caller into a caller identification format, the information being obtained by the gateway device via the Internet service;
   sending, using the gateway device, the formatted information to a communication device; and
   reconnecting, using the gateway device, the communication device to the communication system.

10. The method of claim 9 further comprising:
    detecting, using the gateway device, information for a communication device so information can be formatted.

11. The method of claim 10 further comprising:
    detecting, using the gateway device, and sending information when a trigger is received.

12. The method of claim 10, further comprising:
detecting, using the gateway device, status information related to the communication system.

13. The method of claim 9, further comprising:
automatically sending, using the gateway device, information to the communication device without user interaction.

14. The method of claim 9, further comprising:
sending, using the gateway device, multiple messages to the communication device when an amount of information is greater than can be contained in a single formatted message to the communication device.

15. A system that distributes information through a communication system, comprising:
means for accessing an Internet service;
means for receiving information via the Internet service;
means for detecting whether a predefined code is received from a communication device;
means for disconnecting the communication device from the communication system, if the predefined code is received;
means for formatting the information, the information being unrelated to an identification of a caller into a caller identification format;
means for sending the formatted information to a communication device; and
means for reconnecting the communication device to the communication system.

16. The system of claim 15 further comprising:
means for accepting a trigger that prompts sending of the information to the communication device.

17. The system of claim 15 further comprising:
means for determining which communication device is associated with the received information.

18. The system of claim 15 further comprising:
means for sending multiple messages to the communication device when an amount of information cannot be sent in a single message.

19. The system of claim 15 further comprising:
means for blocking subsequent caller identification messages when a capacity limit is reached on the communication device.

20. An apparatus comprising:
a telephone configured to:
  transmit a predefined number to a telephone system;
  disconnect from the telephone system;
  detect receipt of a call from the telephone system;
  detect receipt of status information, using a caller ID circuit, from the telephone system after ringing a first time but before ringing a second time, the status information being associated with the predefined number, the status information comprising data other than caller identification data; and
  render the status information on a display.

21. A method comprising:
transmitting, using a telephone, a predefined number to a telephone system;
disconnecting, using the telephone, from the telephone system;
detecting, using the telephone, receipt of a call from the telephone system;
detecting, using a caller ID circuit in the telephone, receipt of status information from the telephone system after ringing a first time but before ringing a second time, the status information being associated with the predefined number, the status information comprising data other than caller identification data; and
rendering, using the telephone, the status information on a display.

* * * * *